United States Patent
Chen et al.

(10) Patent No.: US 12,244,100 B2
(45) Date of Patent: Mar. 4, 2025

(54) ELECTRIC CONNECTOR AND ASSEMBLY THEREOF WITH BETTER SHIELDING EFFECT AND BETTER APPEARANCE

(71) Applicant: SPEED TECH CORPORATION, Taoyuan (TW)

(72) Inventors: Chihcheng Chen, Taoyuan (TW); Weichuan Peng, Taoyuan (TW); Chihming Hsu, Taoyuan (TW)

(73) Assignee: SPEED TECH CORPORATION, Taoyuan (TW)

( * ) Notice: Subject to any disclaimer, the term of this patent is extended or adjusted under 35 U.S.C. 154(b) by 426 days.

(21) Appl. No.: 17/720,013

(22) Filed: Apr. 13, 2022

(65) Prior Publication Data

US 2022/0344873 A1   Oct. 27, 2022

(30) Foreign Application Priority Data

Apr. 23, 2021   (CN) .......................... 202110441576.1

(51) Int. Cl.
*H01R 13/00*  (2006.01)
*H01R 12/55*  (2011.01)
*H01R 13/516*  (2006.01)
*H01R 13/6581*  (2011.01)
*H01R 24/60*  (2011.01)

(52) U.S. Cl.
CPC ......... *H01R 13/6581* (2013.01); *H01R 12/55* (2013.01); *H01R 13/516* (2013.01); *H01R 24/60* (2013.01)

(58) Field of Classification Search
CPC .. H01R 13/6581; H01R 12/55; H01R 13/516; H01R 24/60
See application file for complete search history.

(56) References Cited

U.S. PATENT DOCUMENTS 5,254,010 A * 10/1993 Davis .................. H01R 13/658
439/108
6,241,555 B1   6/2001 Okuyama et al.

FOREIGN PATENT DOCUMENTS

TW   M552200 U   11/2017

* cited by examiner

*Primary Examiner* — Phuong Chi Thi Nguyen
(74) *Attorney, Agent, or Firm* — Birch, Stewart, Kolasch & Birch, LLP

(57) ABSTRACT

An electrical connector comprises an insulating body, a number of conductive terminals, and a metal shielding shell. The insulating body comprises a tongue plate. Each conductive terminal comprises a mating portion exposed to the tongue plate. The metal shielding shell at least partially encloses the tongue plate. The metal shielding shell comprises a receiving space for receiving a mating connector. The electrical connector also comprises a metal fixed shell expanding outwardly. Compared with the prior art, the present disclosure shortens the length of the metal shielding shell. After the metal shielding shell is installed on the device shell, it will not be obviously observed from the outside so as to improve the appearance. Besides, the shielding effect is improved by providing the metal fixed shell supported on the device shell. The present disclosure also discloses an electrical connector assembly having the electrical connector.

20 Claims, 25 Drawing Sheets

ELECTRIC CONNECTOR AND ASSEMBLY THEREOF WITH BETTER SHIELDING EFFECT AND BETTER APPEARANCE

CROSS-REFERENCE TO RELATED APPLICATION

This patent application claims priority of a Chinese Patent Application No. 202110441576.1, filed on Apr. 23, 2021 and titled "ELECTRIC CONNECTOR AND ASSEMBLY THEREOF", the entire content of which is incorporated herein by reference.

TECHNICAL FIELD

The present disclosure relates to an electrical connector and an assembly thereof, which belongs to a technical field of connectors.

BACKGROUND

Some electronic devices (for example, notebook computers, etc.) usually comprise a plurality of connector ports. At the port end, a metal shielding shell of an electrical connector has a long length, which causes the metal shielding shell to be seen from the outside. This will affect the appearance of the electronic devices to a certain extent.

Therefore, it is necessary to improve the design of the existing electrical connectors.

SUMMARY

An object of the present disclosure is to provide an electrical connector and an assembly thereof with better shielding effect and better appearance after installation.

In order to achieve the above object, the present disclosure adopts the following technical solution: an electrical connector, including: an insulating body, the insulating body including a tongue plate; a plurality of conductive terminals, each conductive terminal including a mating portion exposed to the tongue plate; a metal shielding shell, the metal shielding shell at least partially enclosing the tongue plate, the metal shielding shell defining a receiving space to receive a mating connector, the tongue plate being at least partially located in the receiving space; and a metal fixed shell, the metal fixed shell being connected to the metal shielding shell, the metal fixed shell expands outwardly with respect to the metal shielding shell.

In order to achieve the above object, the present disclosure adopts the following technical solution: an electrical connector assembly, including: a device shell, the device shell including an outer end surface and an extension protrusion extending inwardly from the outer end surface, the extension protrusion defining a mating slot extending through the outer end surface; and an electrical connector, the electrical connector including: an insulating body, the insulating body including a tongue plate; a plurality of conductive terminals, each conductive terminal including a mating portion exposed to the tongue plate; a metal shielding shell, the metal shielding shell at least partially enclosing the tongue plate, the metal shielding shell defining a receiving space to receive a mating connector, the tongue plate being at least partially located in the receiving space; and a metal fixed shell, the metal fixed shell being connected to the metal shielding shell, the metal fixed shell expands outwardly with respect to the metal shielding shell; wherein the metal fixed shell is fixed on the extension protrusion and hidden in the device shell, and the tongue plate partially extends into the mating slot.

Compared with the prior art, the present disclosure shortens the length of the metal shielding shell, so that after the metal shielding shell is installed on the device shell, it will not be obviously observed from the outside of the device shell, thereby improving the appearance of the device. In addition, the shielding effect is improved by providing the metal fixed shell connected to the metal shielding shell. The metal fixed shell expands outwardly with respect to the metal shielding shell, so that the metal fixed shell deviates outwardly from the receiving space. With this design, on one hand, it is beneficial to increase the shielding area; and on the other hand, it is also beneficial to avoid the metal fixed shell from being observed from the outside of the device shell.

DETAILED DESCRIPTION

Figure 1:
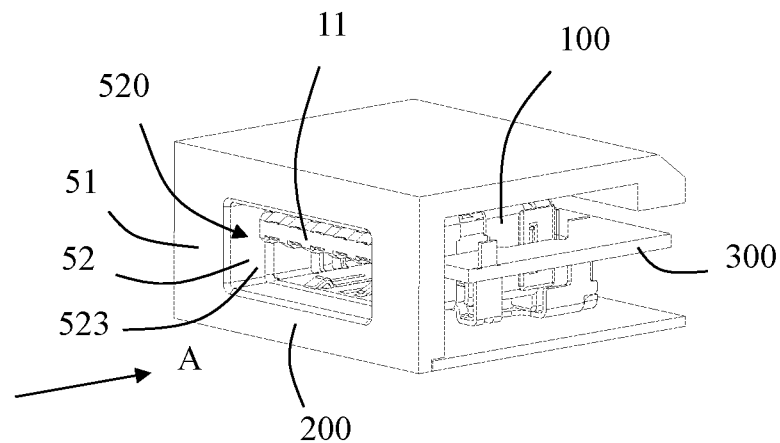
FIG. 1 is a perspective schematic view of an electrical connector assembly in accordance with a first embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 13, a first embodiment illustrated in the present disclosure discloses an electrical connector assembly, which includes an electrical connector 100 and a device shell 200 for installing the electrical connector 100. In the first embodiment shown in the present disclosure, the electrical connector 100 is a USB Type A receptacle connector. The device shell 200 is a shell of an electronic device (such as a notebook computer, etc.). The electrical connector 100 is electrically connected to a circuit board 300 which is located in the device shell 200. The electrical connector 100 is used to cooperate with a mating connector to transmit data and/or access power. The mating connector is inserted into the electrical connector 100 along an insertion direction A. Referring to FIG. 1, the insertion direction A is a left-to-right direction.

Figure 5:
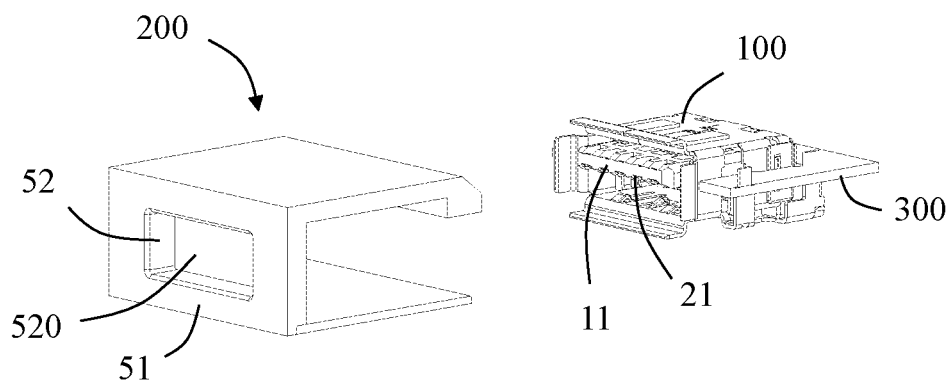
FIG. 5 is a partially exploded perspective view of FIG. 1, in which a device shell is separated.
Figure 6:
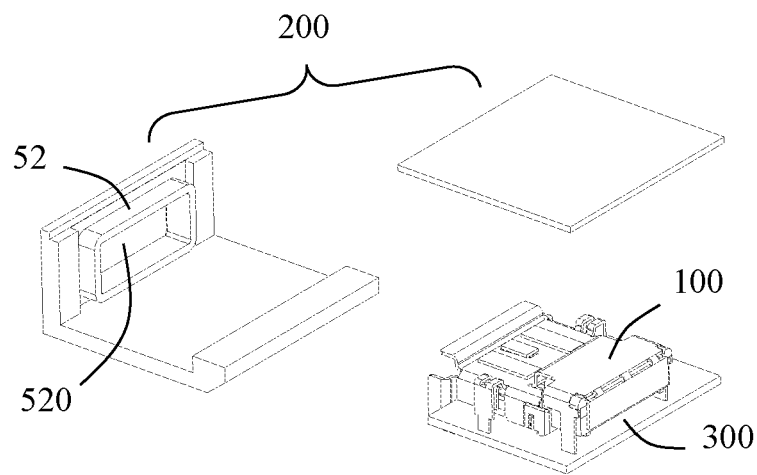
FIG. 6 is another perspective and further exploded view of FIG. 5.
Figure 7:
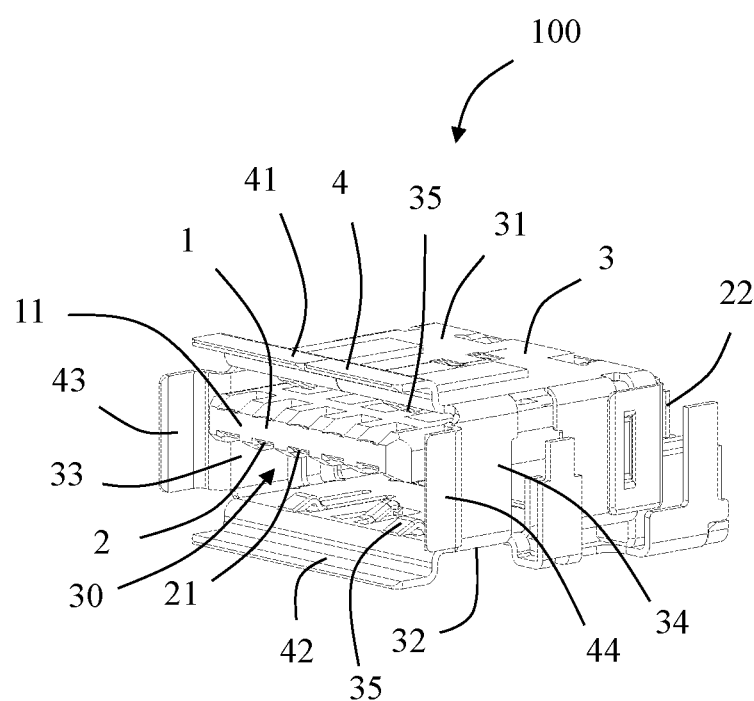
FIG. 7 is a perspective schematic view of an electrical connector in FIG. 5.
Figure 8:
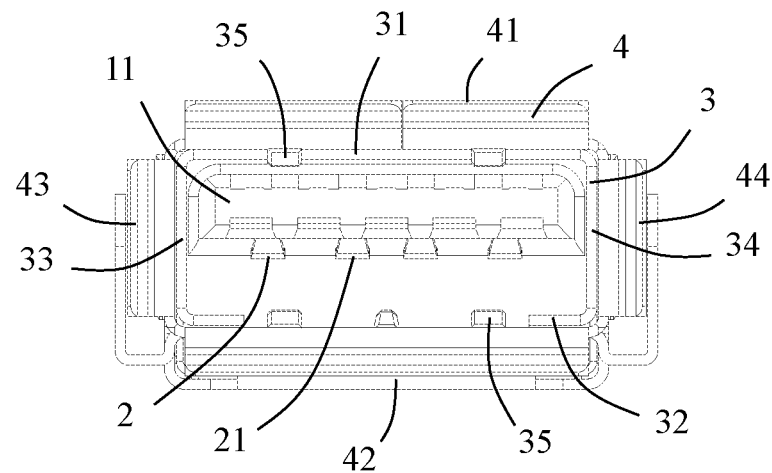
FIG. 8 is a front view of FIG. 7.
Figure 9:
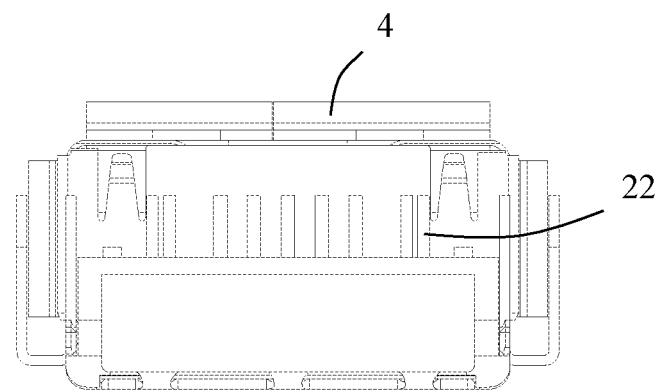
FIG. 9 is a rear view of FIG. 7.
Figure 10:
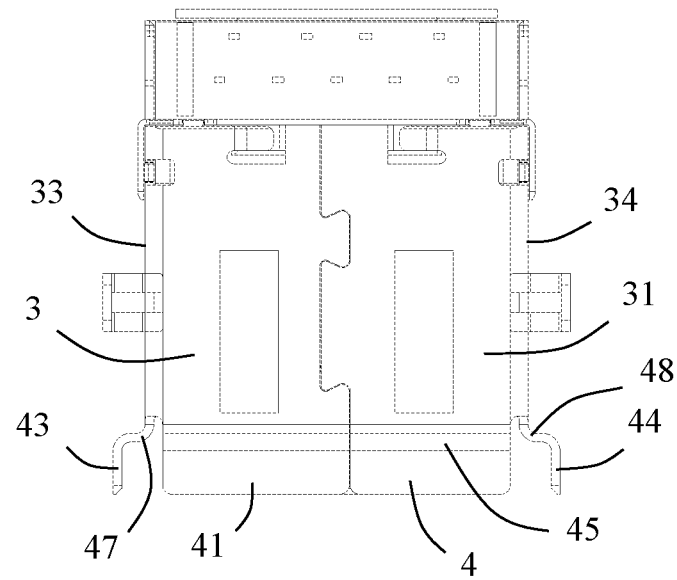
FIG. 10 is a top view of FIG. 7.
Figure 11:
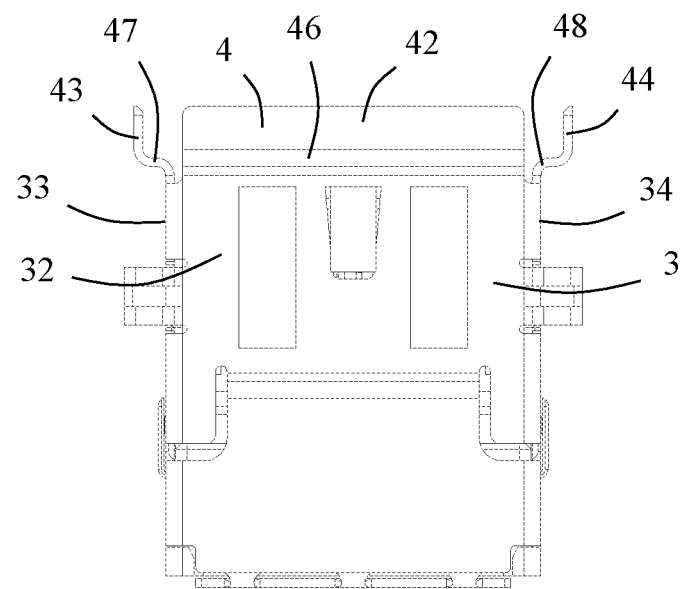
FIG. 11 is a bottom view of FIG. 7.
Figure 12:
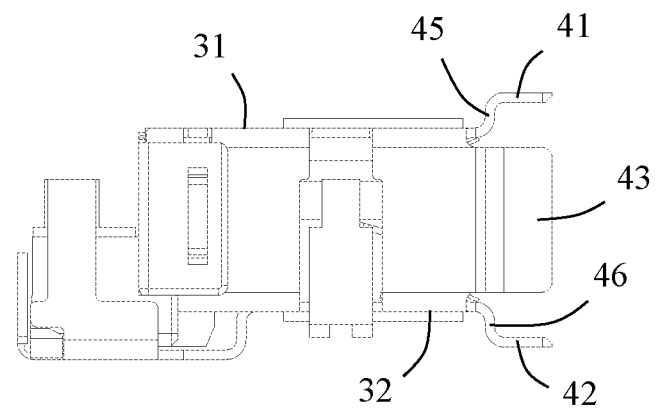
FIG. 12 is a left side view of FIG. 7.
Figure 13:
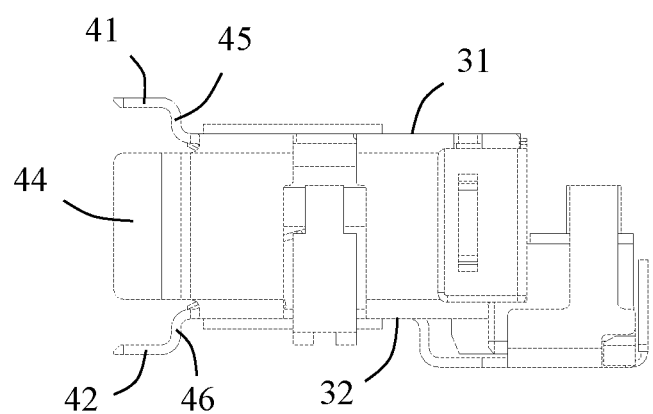
FIG. 13 is a right side view of FIG. 7.

Referring to FIGS. 5 and 6, the device shell 200 includes an outer end surface 51 and an extension protrusion 52 extending inwardly from the outer end surface 51. In the first embodiment shown in the present disclosure, the extension protrusion 52 is substantially rectangular. The extension protrusion 52 includes a mating slot 520 extending through the outer end surface 51. The device shell 200 on which the outer end surface 51 is provided has a certain thickness along the insertion direction A. After the electrical connector 100 is installed in the device shell 200, a part of the electrical connector 100 is hidden in the device shell 200.

Referring to FIGS. 7 to 13, the electrical connector 100 includes an insulating body 1, a plurality of conductive terminals 2 fixed to the insulating body 1, a metal shielding shell 3 enclosing the insulating body 1, and a metal fixed shell 4 fixed to the metal shielding shell 3.

The insulating body 1 includes a tongue plate 11. The tongue plate 11 extends in a direction opposite to the insertion direction A.

Each conductive terminal 2 includes a mating portion 21 exposed to the tongue plate 11 and a tail portion 22 for being soldered to the circuit board 300.

Figure 2:
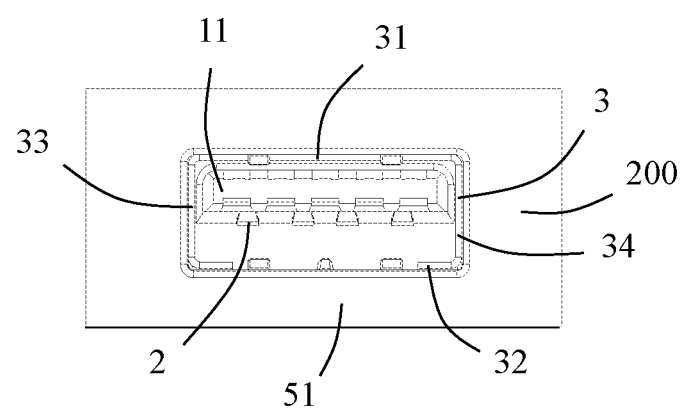
FIG. 2 is a front view of FIG. 1.

The metal shielding shell 3 at least partially encloses the tongue plate 11. The metal shielding shell 3 includes a receiving space 30 for receiving the mating connector. The tongue plate 11 is at least partially located in the receiving space 30. Referring to FIG. 2, when viewed along the insertion direction A of the mating connector, a shape of the mating slot 520 is the same as a shape of the receiving space 30. In the illustrated embodiment of the present disclosure, an outer size of the mating slot 520 is the same as an outer size of the receiving space 30; or, the outer size of the mating slot 520 is slightly larger than the outer size of the receiving space 30.

Specifically, in the first embodiment illustrated in the present disclosure, the metal shielding shell 3 includes a first wall portion 31, a second wall portion 32 opposite to the first wall portion 31, a third wall portion 33 connecting one side of the first wall portion 31 and one side of the second wall portion 32, and a fourth wall portion 34 connecting the other side of the first wall portion 31 and the other side of the second wall portion 32. The first wall portion 31, the second wall portion 32, the third wall portion 33 and the fourth wall portion 34 are jointly enclosed to form the receiving space 30. In the first embodiment illustrated in the present disclosure, the first wall portion 31 is a top wall. The second wall portion 32 is a bottom wall. The third wall portion 33 is the left side wall. The fourth wall portion 34 is the right side wall. Each of the first wall portion 31 and the second wall portion 32 includes a contact elastic piece 35 extending into the receiving space 30. The contact elastic piece 35 is used for abutting against the mating connector, on one hand, it can play a grounding function; on the other hand, it can improve the insertion and extraction force.

The metal fixed shell 4 is adapted to support the electrical connector 100 on the extension protrusion 52 of the device shell 200. The metal fixed shell 4 expands outwardly with respect to the metal shielding shell 3. In the first embodiment shown in the present disclosure, the metal fixed shell 4 expands to the periphery in a direction perpendicular to the insertion direction A and away from the receiving space 30. The tongue plate 11 protrudes beyond the metal shielding shell 3 in a direction opposite to the insertion direction A, but does not protrudes beyond the metal fixed shell 4. That is, an end of the tongue plate 11 is aligned with an end of the metal fixed shell 4 or is located inside the end of the metal fixed shell 4.

Specifically, the metal fixed shell 4 includes an outer wall. In the first embodiment illustrated in the present disclosure, the outer wall includes a fifth wall portion 41, a sixth wall portion 42 opposite to the fifth wall portion 41, a seventh wall portion 43 connecting one side of the fifth wall portion 41 and one side of the sixth wall portion 42, and an eighth wall portion 44 connecting the other side of the fifth wall portion 41 and the other side of the sixth wall portion 42. The fifth wall portion 41 and the first wall portion 31 are located on a same side, and the fifth wall portion 41 protrudes beyond the first wall portion 31 in a direction away from the receiving space 30 (for example, protruding upwardly). The sixth wall portion 42 and the second wall portion 32 are located on a same side, and the sixth wall portion 42 protrudes beyond the second wall portion 32 in a direction away from the receiving space 30 (for example, protruding downwardly). The seventh wall portion 43 and the third wall portion 33 are located on a same side, and the seventh wall portion 43 protrudes beyond the third wall portion 33 in a direction away from the receiving space 30 (for example, protruding to the left). The eighth wall portion 44 and the fourth wall portion 34 are located on a same side, and the eighth wall portion 44 protrudes beyond the fourth wall portion 34 in a direction away from the receiving space 30 (for example, protruding to the right). Of course, in other embodiments, the outer wall may also include at least one of the fifth wall portion 41, the sixth wall portion 42, the seventh wall portion 43, and the eighth wall portion 44. That is, the outer wall may include one wall portion, two wall portions, three wall portions, four wall portions, and so on.

In the first embodiment shown in the present disclosure, the metal fixed shell 4 and the metal shielding shell 3 are integrally formed so as to save cost. Under this design concept, at least one wall of the metal fixed shell 4 is connected to the metal shielding shell 3. In the first embodiment illustrated in the present disclosure, the fifth wall portion 41 is connected to the first wall portion 31. The sixth wall portion 42 is connected to the second wall portion 32. The seventh wall portion 43 is connected to the third wall portion 33. The eighth wall portion 44 is connected to the fourth wall portion 34. Specifically, the metal fixed shell 4 includes a first bending portion 45 connecting the fifth wall portion 41 and the first wall portion 31, a second bending portion 46 connecting the sixth wall portion 42 and the second wall portion 32, a third bending portion 47 connecting the seventh wall portion 43 and the third wall portion 33, and a fourth bending portion 48 connecting the eighth wall portion 44 and the fourth wall portion 34. In the illustrated embodiment of the present disclosure, the first bending portion 45 is perpendicular to the fifth wall portion 41 and the first wall portion 31. The second bending portion 46 is perpendicular to the sixth wall portion 42 and the second wall portion 32. The third bending portion 47 is perpendicular to the seventh wall portion 43 and the third wall portion 33. The fourth bending portion 48 is perpendicular to the eighth wall portion 44 and the fourth wall portion 34. Of course, in other embodiments, the first bending portion 45 may also be inclined with respect to the fifth wall portion 41 and the first wall portion 31. The second bending portion 46 may also be inclined with respect to the sixth wall portion 42 and the second wall portion 32. The third bending portion 47 may also be inclined with respect to the seventh wall portion 43 and the third wall portion 33. The fourth bending portion 48 may also be inclined with respect to the eighth wall portion 44 and the fourth wall portion 34.

Figure 3:
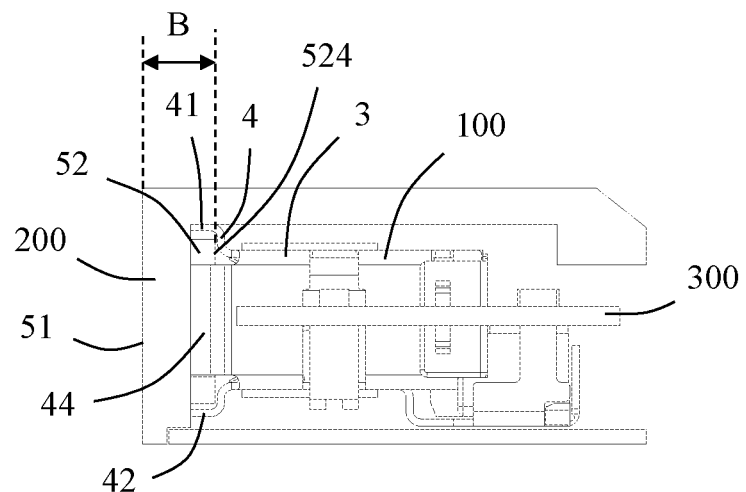
FIG. 3 is a right side view of FIG. 1.
Figure 4:
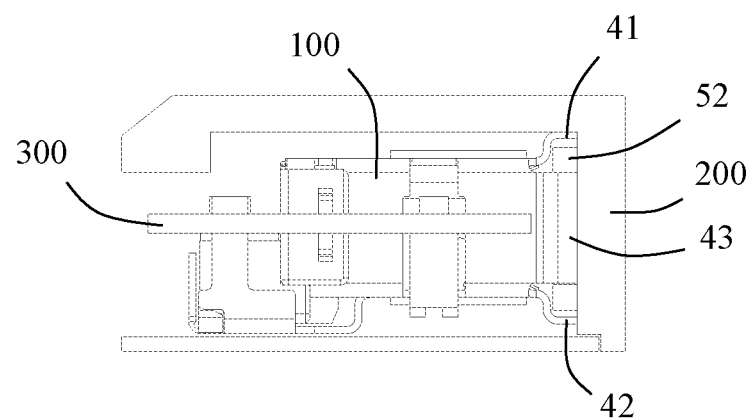
FIG. 4 is a left side view of FIG. 1.

Any of the fifth wall portion 41, the sixth wall portion 42, the seventh wall portion 43, and the eighth wall portion 44 is in a shape of a flat plate. The fifth wall portion 41, the sixth wall portion 42, the seventh wall portion 43, and the eighth wall portion 44 are jointly enclosed to form a frame configuration. Of course, in other embodiments, the fifth wall portion 41, the sixth wall portion 42, the seventh wall portion 43, and the eighth wall portion 44 may also have other shapes (for example, a trumpet shape). It is even necessary to only provide any one of the fifth wall portion 41, the sixth wall portion 42, the seventh wall portion 43, and the eighth wall portion 44. In the first embodiment illustrated in the present disclosure, the fifth wall portion 41, the sixth wall portion 42, the seventh wall portion 43, and the eighth wall portion 44 are disconnected from each other. This design facilitates the bending of the fifth wall portion 41, the sixth wall portion 42, the seventh wall portion 43, and the eighth wall portion 44, respectively, and reduces mutual interference. In the first embodiment illustrated in the present disclosure, the fifth wall portion 41 and the first wall portion 31 are parallel to each other. The sixth wall portion 42 and the second wall portion 32 are parallel to each other. The seventh wall portion 43 and the third wall portion 33 are parallel to each other. The eighth wall portion 44 and the fourth wall portion 34 are parallel to each other. As a result, the fifth wall portion 41, the sixth wall portion 42, the seventh wall portion 43 and the eighth wall portion 44 are more easily fixed on the extension protrusion 52. Of course, in other embodiments, the fifth wall portion 41 and the first wall portion 31 may also be inclined at a certain angle, the sixth wall portion 42 and the second wall portion 32 may also be inclined at a certain angle, the seventh wall portion 43 and the third wall portion 33 may also be inclined at a certain angle, and the eighth wall portion 44 and the fourth wall portion 34 may also be inclined at a certain angle. As a result, the metal fixed shell 4 is made into a trumpet shape, which is more convenient to be fixed on the extension protrusion 52. The metal fixed shell 4 is sleeved on the extension protrusion 52 and hidden in the device shell 200. Referring to FIGS. 3 and 4, the fifth wall portion 41, the sixth wall portion 42, the seventh wall portion 43, and the eighth wall portion 44 extend for certain lengths in a direction opposite to the insertion direction A, which is beneficial to improve the reliability of the engagement with the extension protrusion 52.

Referring to FIG. 3, along the insertion direction A of the mating connector, a dimension between the outer end surface 51 of the device shell 200 and an end surface 524 of the extension protrusion 52 is B, where 1 mm. When the size B of the device shell 200 is designed to be short, it cannot effectively shield the metal shielding shell 3. When the size B of the device shell 200 is designed to be longer, the manufacturing difficulty increases and the cost increases. In an embodiment of the present disclosure, considering parameters such as the type, shape, and size of the electrical connector 100, the inventors designed the size B to be 3 mm based on a large number of analyses and experiments. With this arrangement, while the metal shielding shell 3 can be effectively shielded to improve the appearance, the cost is effectively controlled.

It should be noted that the metal fixed shell 4 in the present disclosure is different from the flanging of the metal shielding shell in the relevant art. The differences between the two include the following: the flanging in the relevant art is mainly to form a guiding structure at the end of the insertion port, so as to improve the smoothness of the mating connector when it is inserted; the flanging in the relevant art is a structure with a very short size, which cannot provide a good shielding effect; and the flanging in the relevant art has an arc structure, and it is not intended to fix the metal shielding shell to the device shell.

Referring to FIGS. 14 to 26, the second embodiment of the present disclosure discloses an electrical connector assembly, which includes an electrical connector 100 and a device shell 200 for installing the electrical connector 100. In the second embodiment illustrated in the present disclosure, the electrical connector 100 is an HDMI receptacle connector. The electrical connector 100 in the second embodiment shown in the present disclosure has a similar structure to the electrical connector 100 in the first embodiment shown in the present disclosure. The parts with the same or corresponding structures are directly cited in the second embodiment shown in the present disclosure, and only the main differences between the first and the second embodiments are described in detail below.

Figure 15:
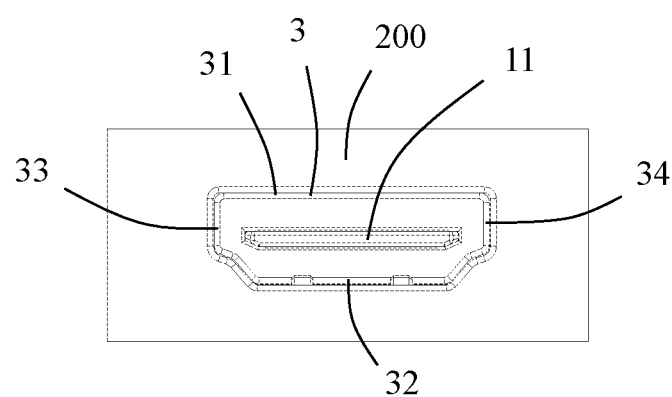
FIG. 15 is a front view of FIG. 14.
Figure 16:
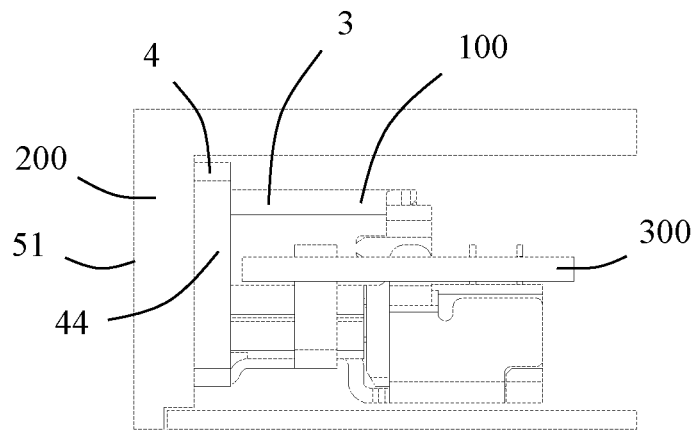
FIG. 16 is a right side view of FIG. 14.
Figure 17:
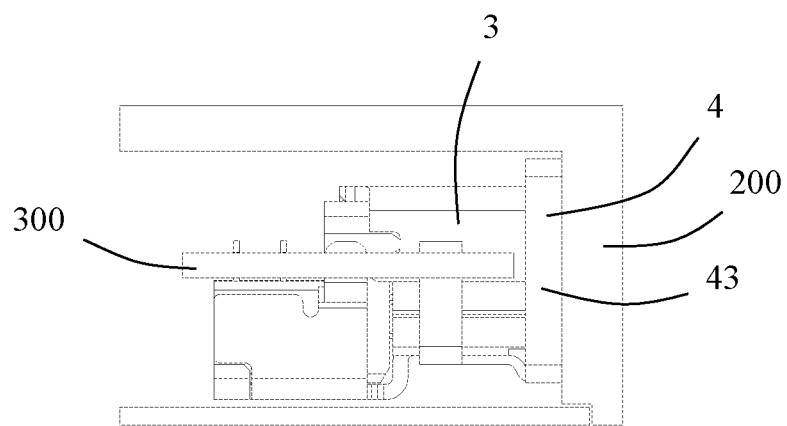
FIG. 17 is a left side view of FIG. 15.
Figure 18:
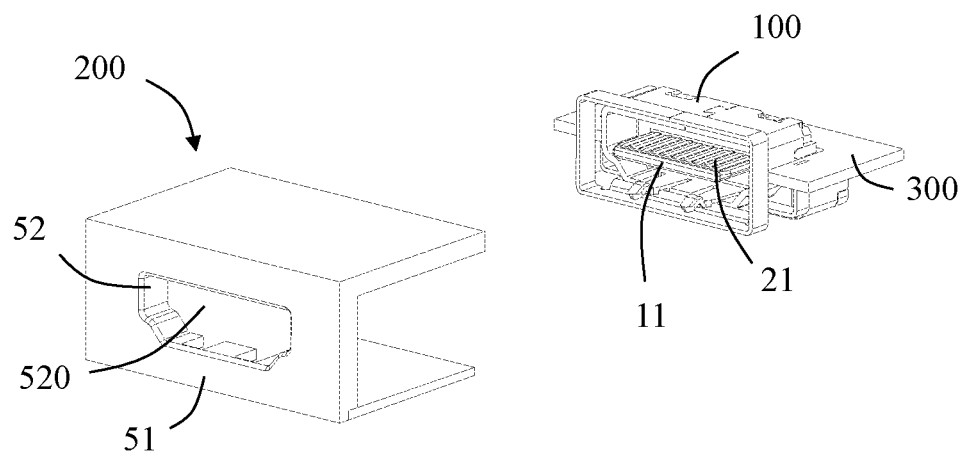
FIG. 18 is a partially exploded perspective view of FIG. 14, in which the device shell is separated.
Figure 19:
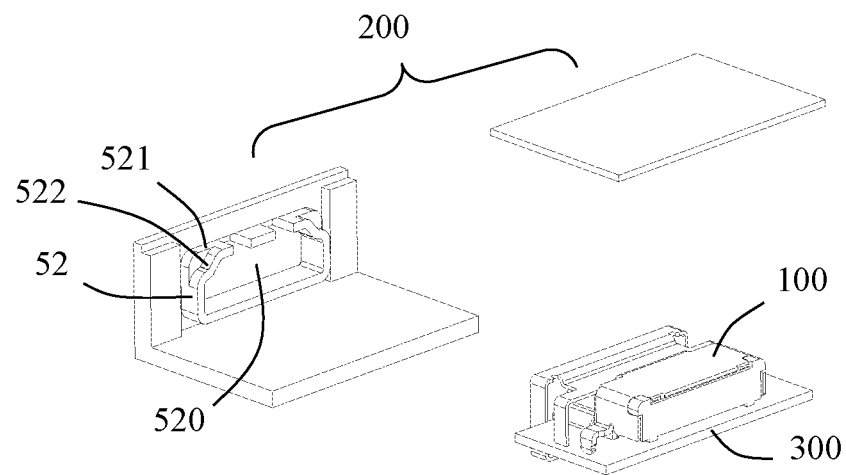
FIG. 19 is another perspective and further exploded view of FIG. 18.
Figure 20:
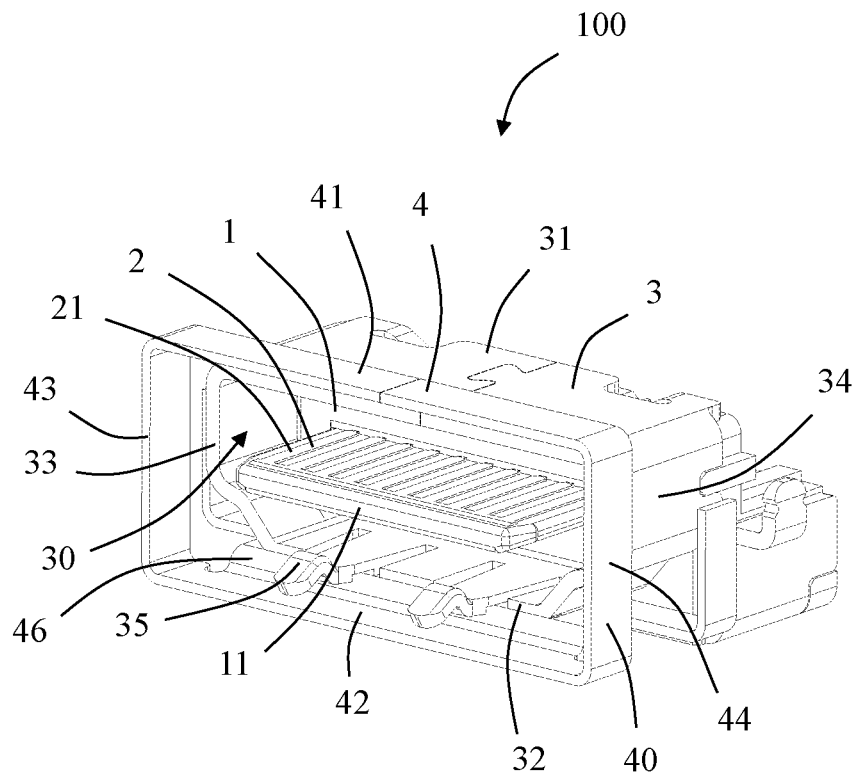
FIG. 20 is a perspective view of the electrical connector in FIG. 18.
Figure 21:
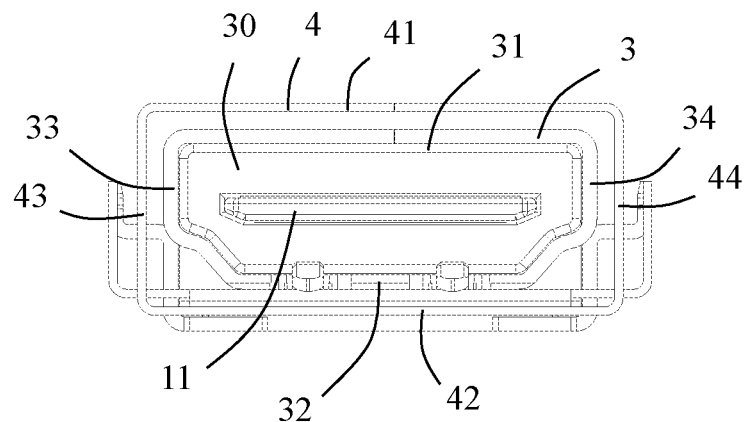
FIG. 21 is a front view of FIG. 20.
Figure 22:
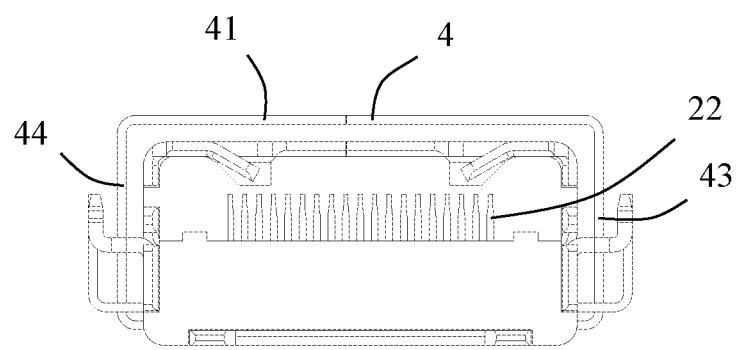
FIG. 22 is a rear view of FIG. 20.
Figure 23:
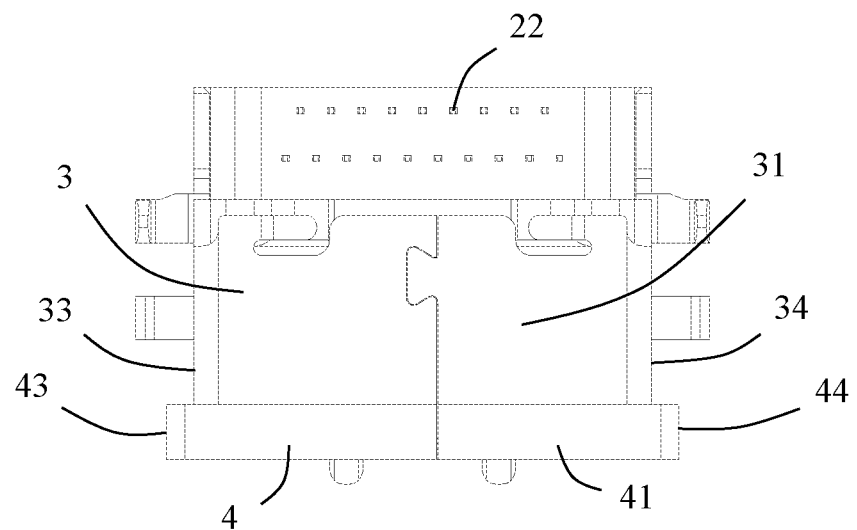
FIG. 23 is a top view of FIG. 20.
Figure 24:
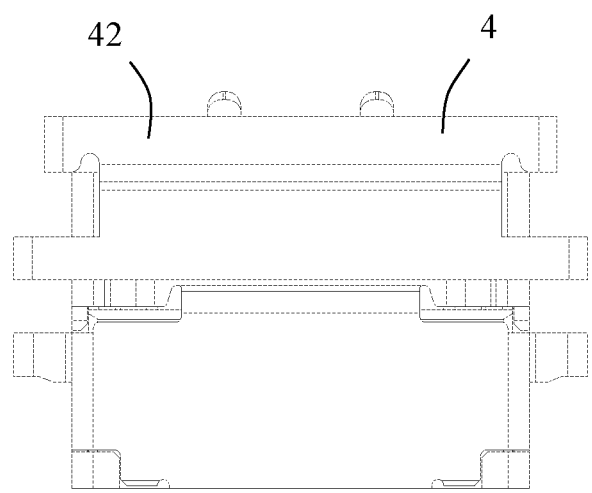
FIG. 24 is a bottom view of FIG. 20.
Figure 25:
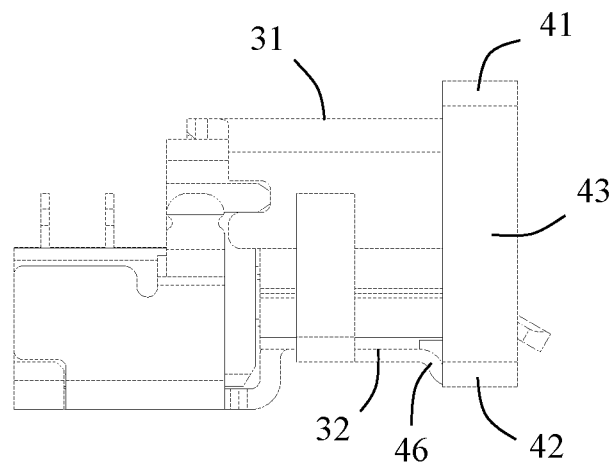
FIG. 25 is a left side view of FIG. 20.
Figure 26:
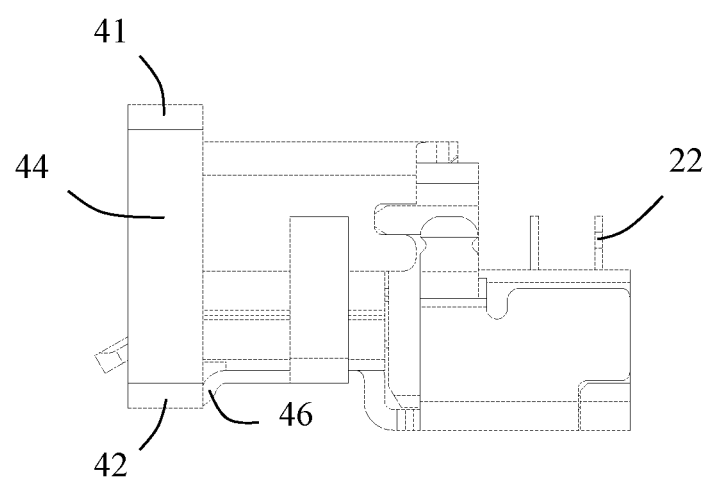
FIG. 26 is a right side view of FIG. 20.

Referring to FIGS. 15, 18 and 19, the extension protrusion 52 in the second embodiment shown in the present disclosure includes a first extension protrusion 521 and a second extension protrusion 522. The shape of the first extension protrusion 521 corresponds to the shape of the end surface of the metal fixed shell 4. The shape of the second extension protrusion 522 corresponds to the shape of the end surface of the metal shielding shell 3 (that is, the shape of the receiving space 30). In the second embodiment shown in the present disclosure, each of the first wall portion 31 and the second wall portion 32 of the metal shielding shell 3 is in a shape of a flat plate. Each of the third wall portion 33 and the fourth wall portion 34 is in a shape of an irregular flat plate.

Referring to FIGS. 20 to 26, the metal fixed shell 4 includes an outer wall. Specifically, in the second embodiment illustrated in the present disclosure, the outer wall includes the fifth wall portion 41, the seventh wall portion 43, the sixth wall portion 42, and the eighth wall portion 44 which are connected end to end so as to form an integral frame 40. The frame 40 is rectangular. Of course, in other embodiments, the outer wall may include at least one of the fifth wall portion 41, the sixth wall portion 42, the seventh wall portion 43, and the eighth wall portion 44. That is, the outer wall may include one wall portion, two wall portions, three wall portions, four wall portions, and so on. In the second embodiment shown in the present disclosure, the metal fixed shell 4 and the metal shielding shell 3 are integrally formed in order to save cost. Under this design concept, at least one wall of the metal fixed shell 4 is connected to the metal shielding shell 3. In the second embodiment shown in the present disclosure, the sixth wall portion 42 is connected to the second wall portion 32, the fifth wall portion 41 is disconnected from the first wall portion 31, the seventh wall portion 43 is disconnected from the third wall portion 33, and the eighth wall portion 44 is disconnected from the fourth wall portion 34. The electrical connector 100 is of a flat configuration, meaning its width in a left-right direction is greater than its height in a top-bottom direction. Compared with connecting the metal fixed shell 4 with the third wall portion 33 and/or the fourth wall portion 34 in an irregular plate shape, the present disclosure connects the sixth wall portion 42 with the second wall 32, which on one hand can facilitate the manufacture of the metal fixed shell 4; and on the other hand, is beneficial to improve the structural strength of the metal fixed shell 4. Of course, it is understandable to those skilled in the art that in other embodiments, the fifth wall portion 41 and the first wall portion 31 may also be connected, the sixth wall portion 42 may also be disconnected from the second wall portion 32, the seventh wall portion 43 may also be disconnected from the third wall portion 33, and the eighth wall portion 44 may also be disconnected from the fourth wall portion 34. Or, in other embodiments, the fifth wall portion 41 and the first wall portion 31 may also be connected, the sixth wall portion 42 may also be connected to the second wall portion 32, the seventh wall portion 43 may also be disconnected from the third wall portion 33, and the eighth wall portion 44 may also be disconnected from the fourth wall portion 34. Specifically, in the second embodiment illustrated in the present disclosure, the metal fixed shell 4 includes a second bending portion 46 connecting the sixth wall portion 42 and the second wall portion 32. In the illustrated embodiment of the present disclosure, the second bending portion 46 is inclined relative to the sixth wall portion 42 and the second wall portion 32. Of course, in other embodiments, the second bending portion 46 may also be perpendicular to the sixth wall portion 42 and the second wall portion 32.

Referring to FIGS. 27 to 39, the third embodiment of the present disclosure discloses an electrical connector assembly, which includes an electrical connector 100 and a device shell 200 for installing the electrical connector 100. In the third embodiment shown in the present disclosure, the electrical connector 100 is a USB Type C receptacle connector. The electrical connector 100 in the third embodiment shown in the present disclosure is similar in structure to the electrical connector 100 in the first embodiment shown in the present disclosure. The parts with the same or corresponding structures of the present disclosure are directly cited in the third embodiment shown in the present disclosure. Only the main differences between the first embodiment and the third embodiment are described in detail below.

Figure 28:
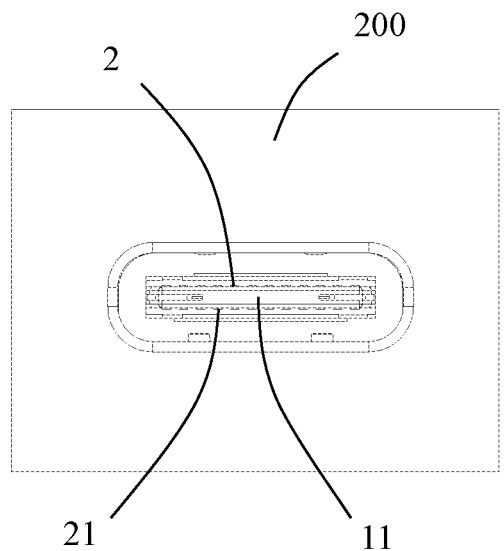
FIG. 28 is a front view of FIG. 27.
Figure 29:
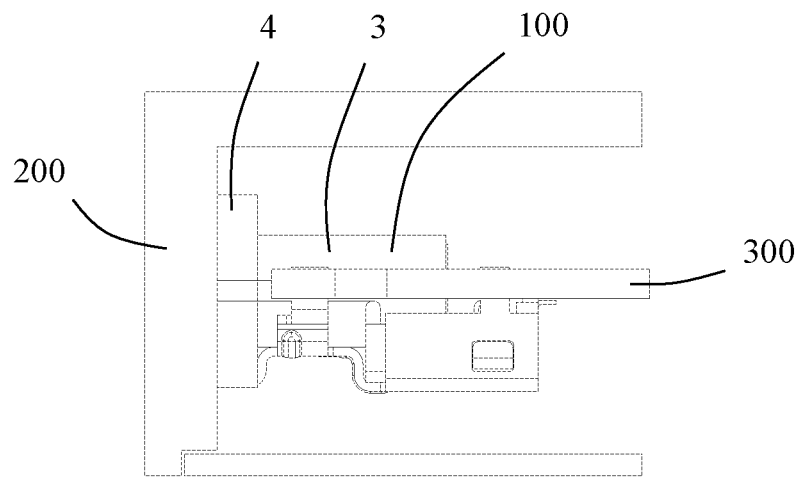
FIG. 29 is a right side view of FIG. 27.
Figure 30:
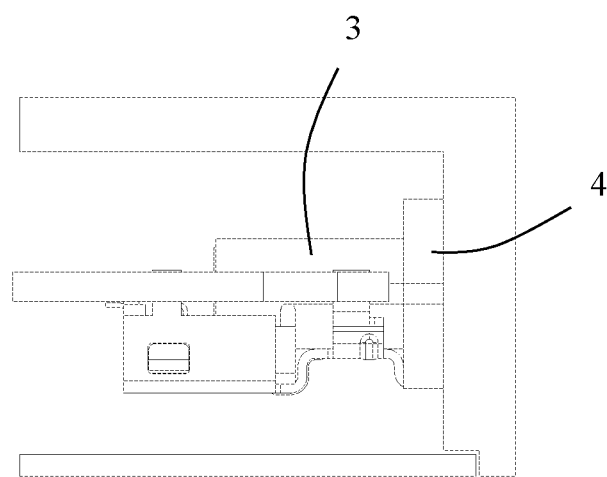
FIG. 30 is a left side view of FIG. 27.
Figure 31:
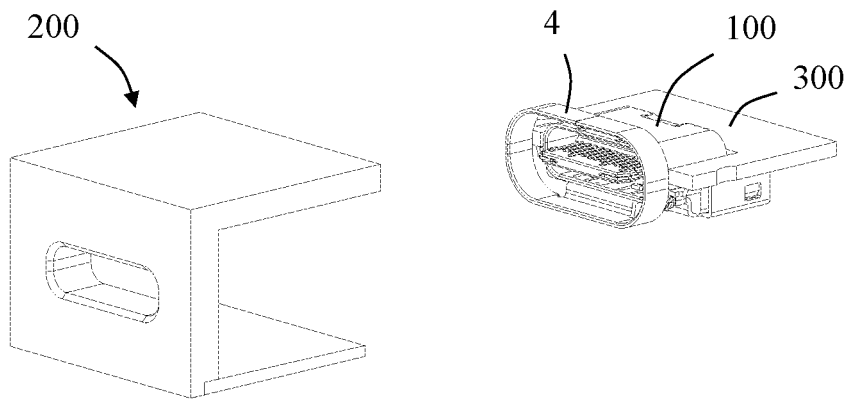
FIG. 31 is a partially exploded perspective view of FIG. 27, in which the device shell is separated.
Figure 32:
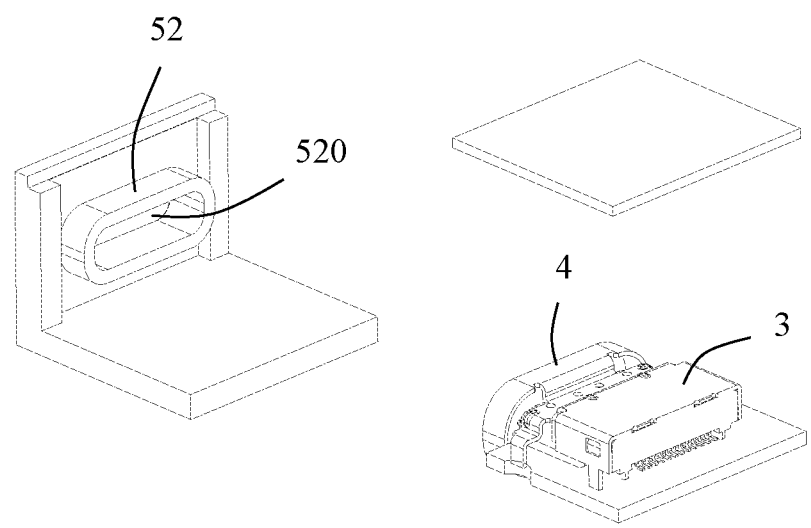
FIG. 32 is another perspective and further exploded view of FIG. 31.
Figure 33:
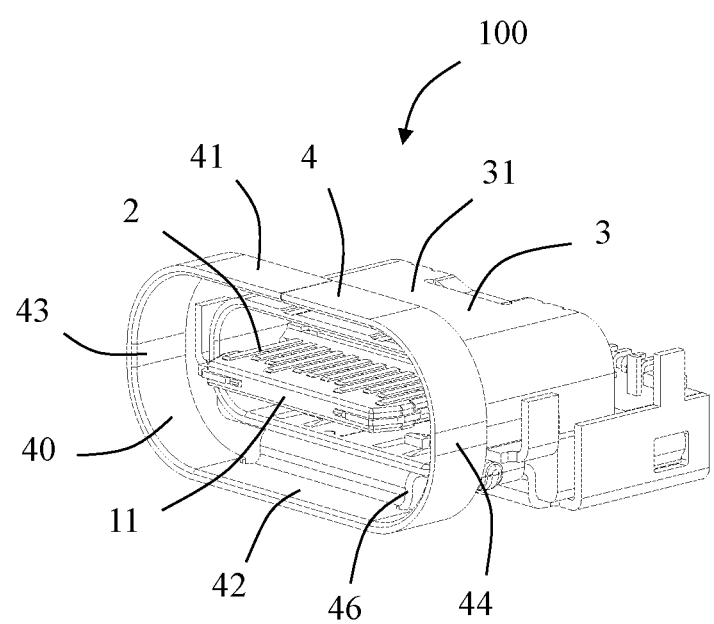
FIG. 33 is a perspective view of the electrical connector in FIG. 31.
Figure 34:
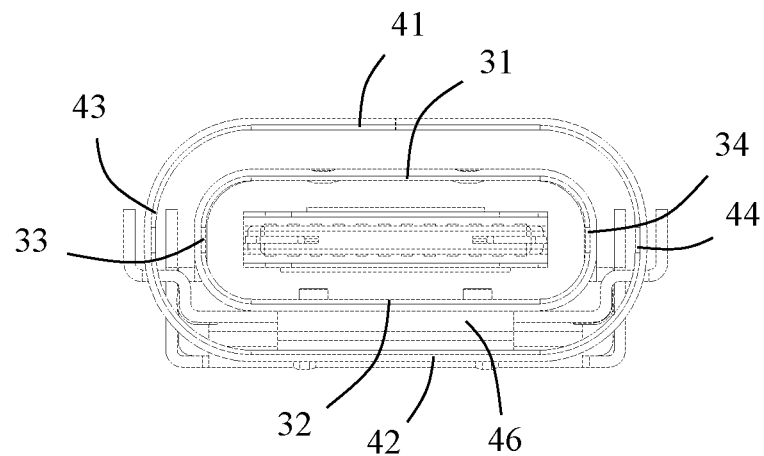
FIG. 34 is a front view of FIG. 33.
Figure 35:
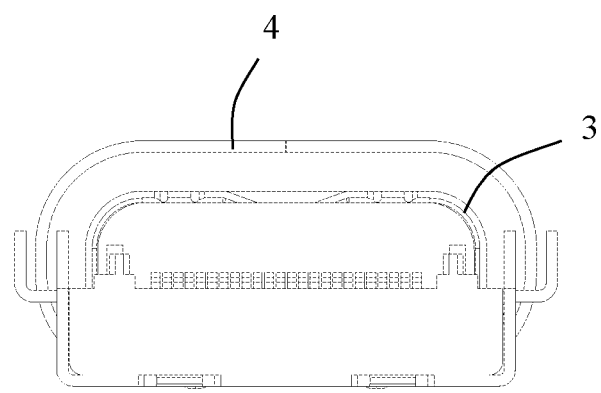
FIG. 35 is a rear view of FIG. 33.
Figure 36:
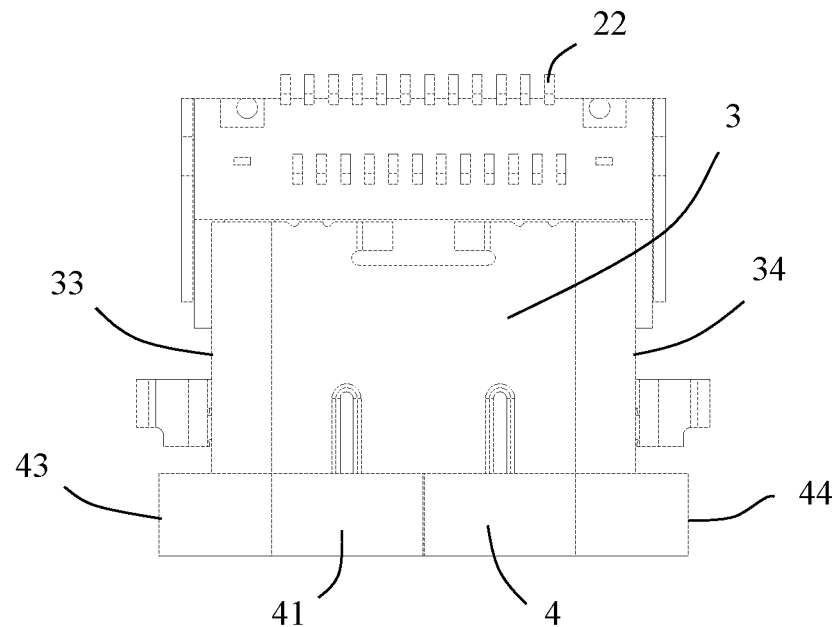
FIG. 36 is a top view of FIG. 33.
Figure 37:
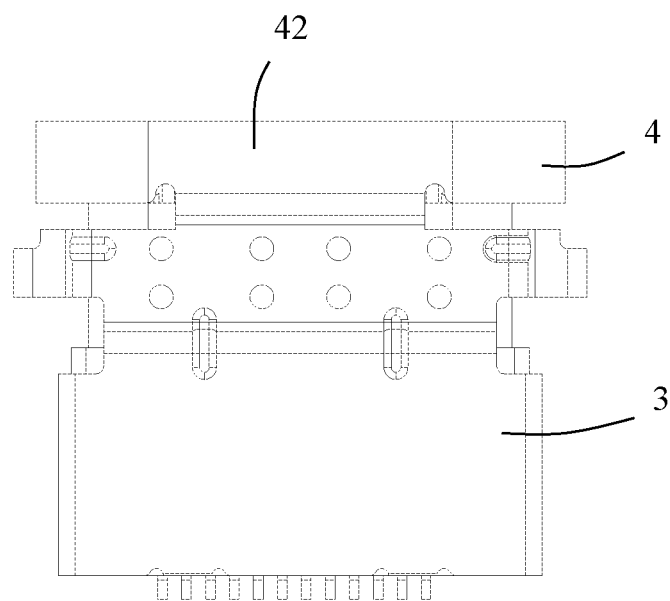
FIG. 37 is a bottom view of FIG. 33.
Figure 38:
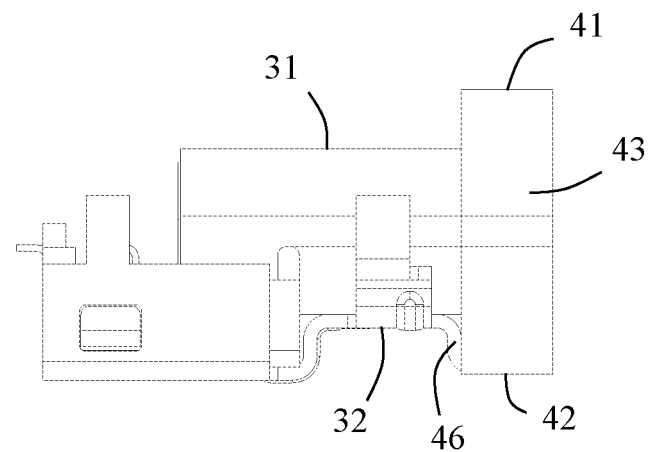
FIG. 38 is a left side view of FIG. 33.
Figure 39:
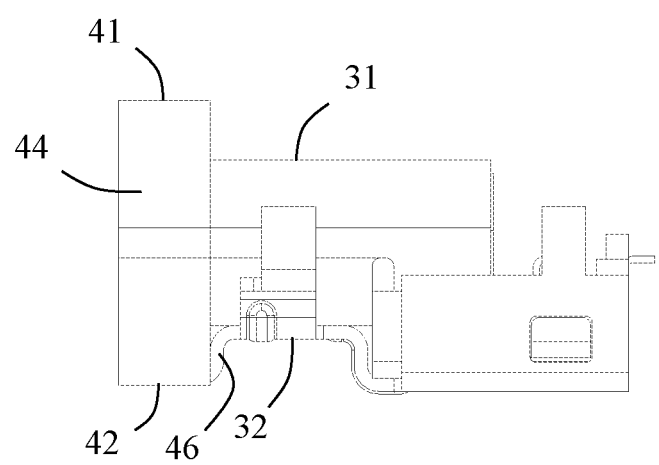
FIG. 39 is a right side view of FIG. 33.
Figure 40:
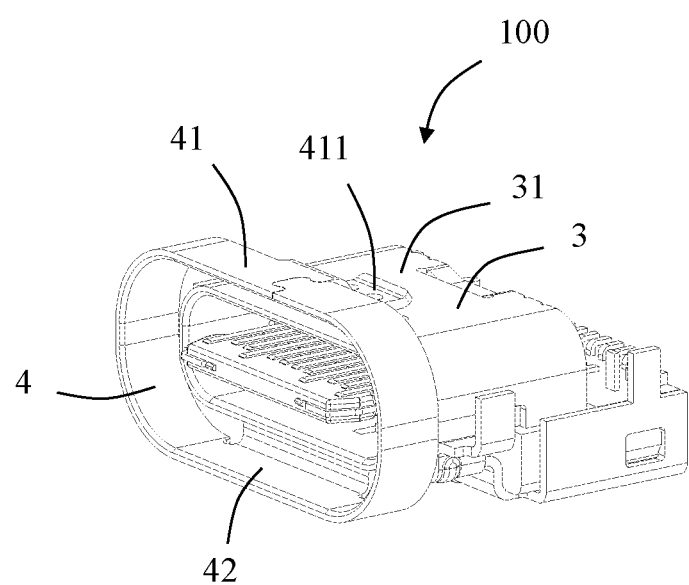
FIG. 40 is a perspective schematic view of the electrical connector in FIG. 33 in another embodiment.
Figure 41:
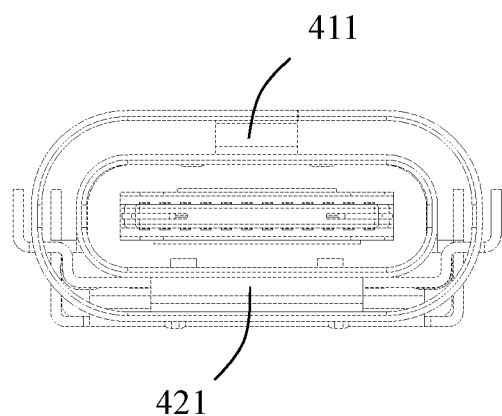
FIG. 41 is a front view of FIG. 40.
Figure 42:
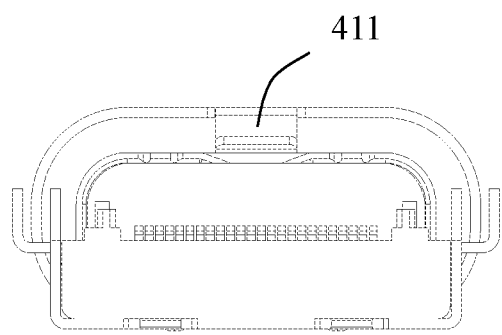
FIG. 42 is a rear view of FIG. 40.
Figure 43:
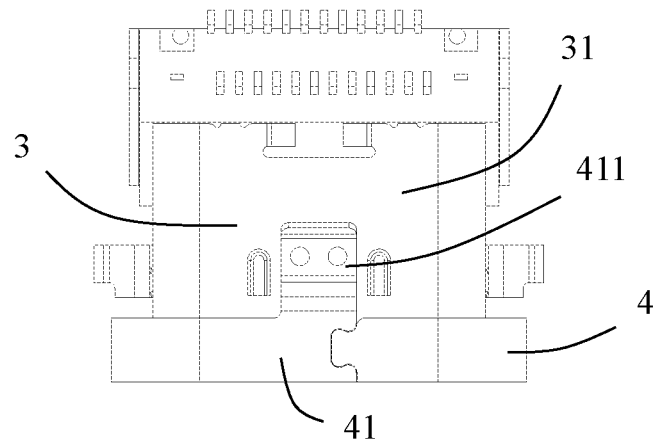
FIG. 43 is a top view of FIG. 40.
Figure 44:
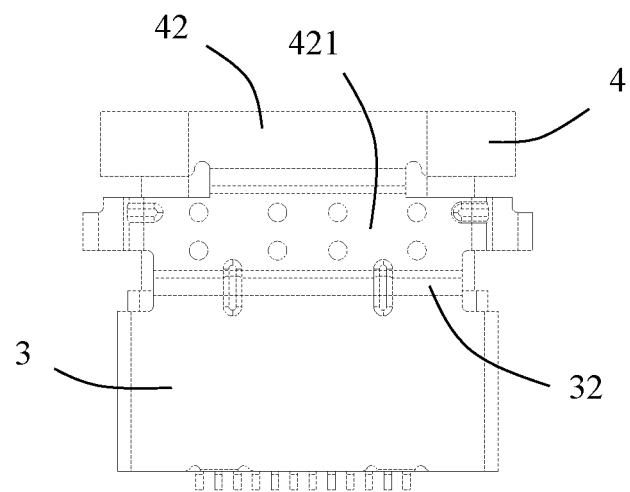
FIG. 44 is a bottom view of FIG. 40.
Figure 45:
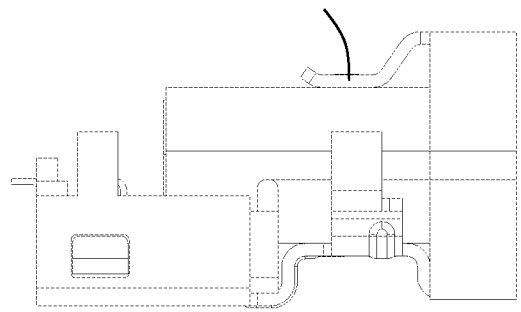
FIG. 45 is a left side view of FIG. 40.
Figure 46:
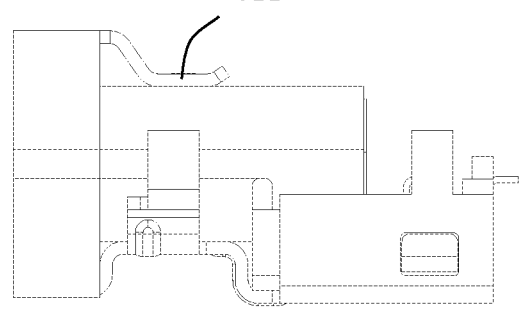
FIG. 46 is a right side view of FIG. 40.

Referring to FIGS. 28, 31 and 32, the extension protrusion 52 in the third embodiment shown in the present disclosure is of an oval configuration, and matches the shape of the metal fixed shell 4. In the third embodiment illustrated in the present disclosure, each of the first wall portion 31 and the second wall portion 32 of the metal shielding shell 3 is in the shape of a flat plate. Each of the third wall portion 33 and the fourth wall portion 34 is arc-shaped.

The metal fixed shell 4 includes an outer wall. Specifically, in the third embodiment shown in the present disclosure, the outer wall includes a fifth wall portion 41, a sixth wall portion 42 opposite to the fifth wall portion 41, a seventh wall portion 43 connecting one side of the fifth wall portion 41 and one side of the sixth wall portion 42, and an eighth wall portion 44 connecting the other side of the fifth wall portion 41 and the other side of the sixth wall portion 42. The fifth wall portion 41, the seventh wall portion 43, the sixth wall portion 42, and the eighth wall portion 44 of the metal fixed shell 4 are connected end to end in sequence so as to form an integral frame 40. The frame 40 is of an oval configuration. The seventh wall portion 43 and the eighth wall portion 44 are arc-shaped. Of course, in other embodiments, the outer wall may include at least one of the fifth wall portion 41, the sixth wall portion 42, the seventh wall portion 43, and the eighth wall portion 44. That is, the outer wall may include one wall portion, two wall portions, three wall portions, four wall portions, and so on. In the third embodiment shown in the present disclosure, the metal fixed shell 4 and the metal shielding shell 3 are integrally formed in order to save cost. Under this design concept, at least one wall of the metal fixed shell 4 is connected to the metal shielding shell 3. In the third embodiment illustrated in the present disclosure, the sixth wall portion 42 is connected to the second wall portion 32, the fifth wall portion 41 is disconnected from the first wall portion 31, the seventh wall portion 43 is disconnected from the third wall portion 33, and the eighth wall portion 44 is disconnected from the fourth wall portion 34. The electrical connector 100 is of a flat configuration, meaning its width in the left-right direction is greater than its height in the top-bottom direction. Compared with connecting the metal fixed shell 4 with the third wall portion 33 and/or the fourth wall portion 34 in an arc-shape, the present disclosure connects the sixth wall portion 42 with the second wall portion 32, which on one hand, the metal fixed shell 4 can be easily manufactured; and on the other hand, is beneficial to improve the structural strength of the metal fixed shell 4. Of course, it is understandable to those skilled in the art that in other embodiments, the fifth wall portion 41 and the first wall portion 31 may also be connected, the sixth wall portion 42 may also be disconnected from the second wall portion 32, the seventh wall portion 43 may also be disconnected from the third wall portion 33, and the eighth wall portion 44 may also be disconnected from the fourth wall portion 34. Or, in other embodiments, the fifth wall portion 41 and the first wall portion 31 may also be connected, the sixth wall portion 42 may also be connected to the second wall portion 32, the seventh wall portion 43 may also be disconnected from the third wall portion 33, and the eighth wall portion 44 may also be disconnected from the fourth wall portion 34. Specifically, the metal fixed shell 4 includes a second bending portion 46 connecting the sixth wall portion 42 and the second wall portion 32. In the illustrated embodiment of the present disclosure, the second bending portion 46 is perpendicular to the sixth wall portion 42 and the second wall portion 32. Of course, in other embodiments, the second bending portion 46 may also be inclined with respect to the sixth wall portion 42 and the second wall portion 32.

It is understandable to those skilled in the art that, as an alternative to the above three specific embodiments, the metal fixed shell 4 and the metal shielding shell 3 can also be provided separately, and the metal fixed shell 4 and the metal shielding shell 3 are connected and fixed. There may be many ways of connection and fixation. For example, the metal fixed shell 4 and the metal shielding shell 3 are connected and fixed by spot soldering or laser soldering. In this case, the material of the metal fixed shell 4 does not necessarily need to be the same as the material of the metal shielding shell 3. For example, in order to improve the shielding effect, the material of the metal fixed shell 4 can be other metal materials with better shielding performance.

Specifically, referring to FIGS. 40 to 46, in another embodiment of the electrical connector 100 of the present disclosure, the metal fixed shell 4 and the metal shielding shell 3 are arranged separately, but are fixed together. The metal fixed shell 4 includes a first engaging arm 411 extending from the fifth wall portion 41 and a second engaging arm 421 extending from the sixth wall portion 42. The first engaging arm 411 is fixed to the first wall portion 31 by spot soldering. The second engaging arm 421 is fixed to the second wall portion 32 by spot soldering. Of course, in other embodiments, only one of the first engaging arm 411 and the second engaging arm 421 may also be provided.

In addition, the type of the electrical connector 100 disclosed in the present disclosure is not limited to the ones described above, and it may also include a DisplayPort receptacle connector and the like. It is understandable to those skilled in the art that any electrical connector of this type having a tongue plate and a metal shielding shell can adopt the concept of the present disclosure to make corresponding improvements.

Figure 14:
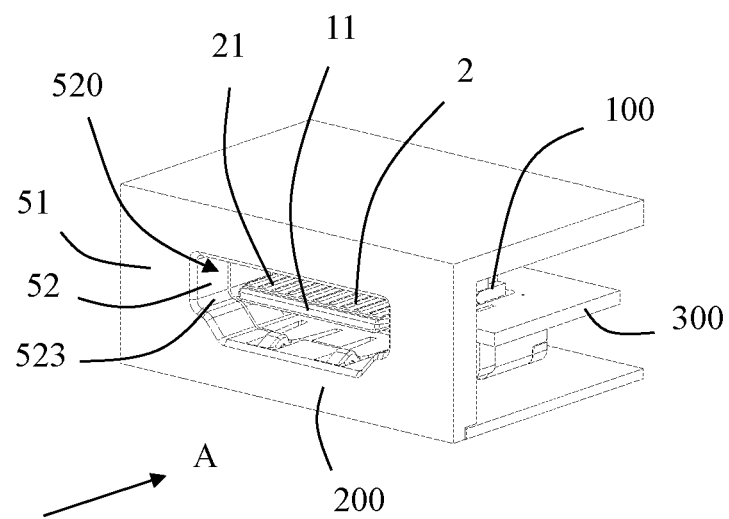
FIG. 14 is a perspective schematic view of the electrical connector assembly in accordance with a second embodiment of the present disclosure.
Figure 27:
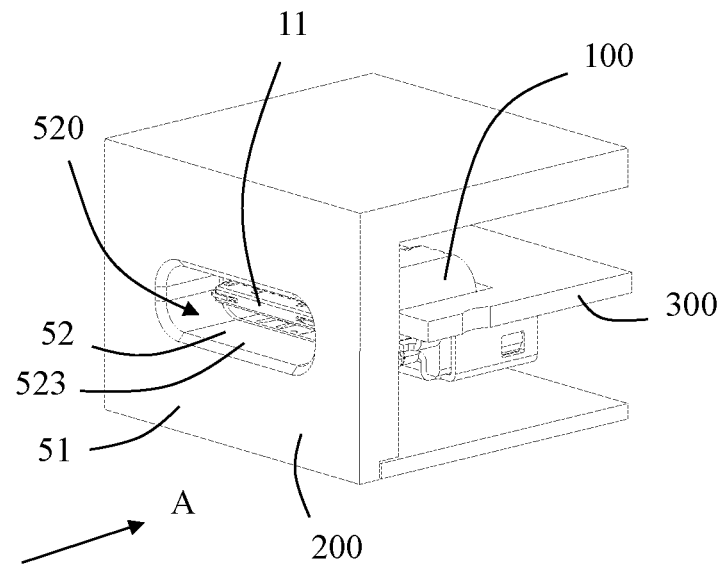
FIG. 27 is a perspective schematic view of the electrical connector assembly in accordance with a third embodiment of the present disclosure.

Compared with the prior art, the present disclosure shortens the length of the metal shielding shell 3 along the insertion direction A, so that the metal shielding shell 3 will not be obviously observed from the device shell after it is installed in the device shell 200. Referring to FIGS. 1, 14 and 27, what can be clearly observed from the outside of the device shell 200 is the inner surface 523 of the extension protrusion 52, which is beneficial to improve the appearance. In addition, although the length of the metal shielding shell 3 is shortened, the shielding effect is improved by providing the metal fixed shell 4 supported on the device shell 200. The metal fixed shell 4 expands outwardly relative to the metal shielding shell 3, thereby causing the metal fixed shell 4 to deviate outwardly from the receiving space 30. As a result, on one hand, it is beneficial to increase the shielding area; on the other hand, it is also beneficial to avoid the metal fixed shell 4 from being observed from the outside of the device shell 200, thereby improving the appearance.

The above embodiments are only used to illustrate the present disclosure and not to limit the technical solutions described in the present disclosure. The understanding of this specification should be based on those skilled in the art. Descriptions of directions, such as "front", "back", "left", "right", "top" and "bottom", although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:
    an insulating body, the insulating body comprising a tongue plate;
    a plurality of conductive terminals, each conductive terminal comprising a mating portion exposed to the tongue plate;
    a metal shielding shell, the metal shielding shell at least partially enclosing the tongue plate, the metal shielding shell defining a receiving space to receive a mating connector, the tongue plate being at least partially located in the receiving space; and
    a metal fixed shell, the metal fixed shell being connected to the metal shielding shell, the metal fixed shell extends forwardly and expands outwardly with respect to the metal shielding shell;
    wherein the metal shielding shell comprises a first wall portion, a second wall portion opposite to the first wall portion, a third wall portion connecting one side of the first wall portion and one side of the second wall portion, and a fourth wall portion connecting another side of the first wall portion and another side of the second wall portion; the receiving space is jointly enclosed by the first wall portion, the second wall portion, the third wall portion, and the fourth wall portion; and
    wherein the metal fixed shell comprises an outer wall; the outer wall is located on a same side as at least one wall portion of the first wall portion, the second wall portion, the third wall portion and the fourth wall portion; the outer wall protrudes beyond the at least one wall portion in a direction away from the receiving space;

and the outer wall is parallel to the at least one wall portion which is located on the same side as the outer wall.

2. The electrical connector according to claim 1, wherein the metal fixed shell and the metal shielding shell are integrally formed.

3. The electrical connector according to claim 1, wherein the metal fixed shell and the metal shielding shell are arranged separately, and the metal fixed shell is connected and fixed to the metal shielding shell.

4. The electrical connector according to claim 1, wherein the tongue plate protrudes beyond the metal shielding shell, but does not protrude beyond the metal fixed shell.

5. The electrical connector according to claim 1, wherein the electrical connector is one of a USB Type A receptacle connector, a USB Type C receptacle connector, an HDMI receptacle connector and a DisplayPort receptacle connector.

6. The electrical connector according to claim 1, wherein the outer wall comprises a fifth wall portion and a sixth wall portion opposite to the fifth wall portion, the fifth wall portion and the first wall portion are located on a first same side, and the fifth wall portion protrudes beyond the first wall portion in a direction away from the receiving space; wherein the sixth wall portion and the second wall portion are located on a second same side, and the sixth wall portion protrudes beyond the second wall portion in a direction away from the receiving space; and wherein the fifth wall portion is connected to the first wall portion; and/or, the sixth wall portion is connected to the second wall portion.

7. The electrical connector according to claim 6, wherein any of the first wall portion, the second wall portion, the fifth wall portion, and the sixth wall portion is in a shape of a flat plate.

8. The electrical connector according to claim 6, wherein the fifth wall portion and the first wall portion are parallel to each other; and the sixth wall portion and the second wall portion are parallel to each other.

9. The electrical connector according to claim 1, wherein the outer wall comprises a fifth wall portion, a sixth wall portion opposite to the fifth wall portion, a seventh wall portion connecting one side of the fifth wall portion and one side of the sixth wall portion, and an eighth wall portion connecting another side of the fifth wall portion and another side of the sixth wall portion; the fifth wall portion and the first wall portion are located on a first same side, the fifth wall portion protrudes beyond the first wall portion in a direction away from the receiving space; the sixth wall portion and the second wall portion are located on a second same side, the sixth wall portion protrudes beyond the second wall portion in a direction away from the receiving space; the seventh wall portion and the third wall portion are located on a third same side, the seventh wall portion protrudes beyond the third wall portion in a direction away from the receiving space; the eighth wall portion and the fourth wall portion are located on a fourth same side, the eighth wall portion protrudes beyond the fourth wall portion in a direction away from the receiving space.

10. The electrical connector according to claim 9, wherein the first wall portion and the fifth wall portion are top walls; the second wall portion and the sixth wall portion are bottom walls, the third wall portion and the seventh wall portion are left side walls; and the fourth wall portion and the eighth wall portion are right side walls.

11. The electrical connector according to claim 9, wherein the fifth wall portion and the first wall portion are parallel to each other;

the sixth wall portion and the second wall portion are parallel to each other;
the seventh wall portion and the third wall portion are parallel to each other; and
the eighth wall portion and the fourth wall portion are parallel to each other.

12. The electrical connector according to claim 9, wherein the fifth wall portion, the sixth wall portion, the seventh wall portion and the eighth wall portion jointly forms a frame-shaped configuration.

13. The electrical connector according to claim 12, wherein the fifth wall portion is connected to the first wall portion, the sixth wall portion is connected to the second wall portion, the seventh wall portion is connected to the third wall portion, and the eighth wall portion is connected to the fourth wall portion; and wherein the fifth wall portion, the sixth wall portion, the seventh wall portion, and the eighth wall portion are disconnected from one another along a circumferential direction of the outer wall.

14. The electrical connector according to claim 12, wherein the fifth wall portion, the seventh wall portion, the sixth wall portion, and the eighth wall portion are connected end to end in sequence so as to form an integral frame along a circumferential direction of the outer wall; and wherein the fifth wall portion is disconnected from the first wall portion, the sixth wall portion is connected to the second wall portion, the seventh wall portion is disconnected from the third wall portion, and the eighth wall portion is disconnected from the fourth wall portion.

15. The electrical connector according to claim 14, wherein the frame is of a rectangular or an oval configuration.

16. An electrical connector assembly, comprising:
a device shell, the device shell comprising an outer end surface and an extension protrusion extending inwardly from the outer end surface, the extension protrusion defining a mating slot extending through the outer end surface; and
an electrical connector, the electrical connector comprising:
an insulating body, the insulating body comprising a tongue plate;
a plurality of conductive terminals, each conductive terminal comprising a mating portion exposed to the tongue plate;
a metal shielding shell, the metal shielding shell at least partially enclosing the tongue plate, the metal shielding shell defining a receiving space to receive a mating connector, the tongue plate being at least partially located in the receiving space; and
a metal fixed shell, the metal fixed shell being connected to the metal shielding shell, the metal fixed shell expands outwardly with respect to the metal shielding shell;
wherein the metal fixed shell is fixed on the extension protrusion and hidden in the device shell, and the tongue plate partially extends into the mating slot.

17. The electrical connector assembly according to claim 16, wherein when viewed along an insertion direction of the mating connector, a shape of the mating slot is the same as a shape of the receiving space.

18. The electrical connector assembly according to claim 16, wherein along an insertion direction of the mating connector, a dimension between the outer end surface of the device shell and an end surface of the extension protrusion is B, where 1 mm≤B≤5 mm.

19. The electrical connector assembly according to claim 16, wherein along an insertion direction of the mating connector, a dimension between the outer end surface of the device shell and an end surface of the extension protrusion is 3 mm.

20. The electrical connector assembly according to claim 16, wherein the tongue plate protrudes beyond the metal shielding shell, but does not protrude beyond the metal fixed shell.

* * * * *